United States Patent [19]

Lee et al.

[11] Patent Number: 5,475,827
[45] Date of Patent: Dec. 12, 1995

[54] DYNAMIC LOOK-ASIDE TABLE FOR MULTIPLE SIZE PAGES

[75] Inventors: Jeffery Y. Lee, Saugerties; Jamshed H. Mirza, Woodstock; Robert J. Stanton, Jr., Hyde Park, all of N.Y.

[73] Assignee: International Business Machines Corporation, Armonk, N.Y.

[21] Appl. No.: 223,366

[22] Filed: Apr. 1, 1994

Related U.S. Application Data

[63] Continuation of Ser. No. 668,568, Mar. 13, 1991, abandoned.

[51] Int. Cl.$^6$ ..................................................... G06F 12/10
[52] U.S. Cl. ................................................ 395/417; 395/419
[58] Field of Search ........................................ 395/400, 425; 365/49

[56] References Cited

U.S. PATENT DOCUMENTS

| | | | |
|---|---|---|---|
| 3,675,215 | 7/1972 | Arnold et al. | 395/400 |
| 4,356,549 | 10/1982 | Chueh | 395/400 |
| 4,638,426 | 1/1987 | Chang et al. | 395/400 |
| 4,682,281 | 7/1987 | Woffinden et al. | 395/400 |
| 4,695,950 | 9/1987 | Brandt et al. | 395/400 |
| 4,774,659 | 9/1988 | Smith et al. | 395/400 |
| 4,797,814 | 1/1989 | Brenza | 395/425 |
| 4,823,259 | 4/1989 | Aichelmann, Jr. et al. | 395/425 |
| 4,835,734 | 5/1989 | Kodaira et al. | 395/400 |
| 4,876,646 | 10/1989 | Gotou et al. | 395/400 |
| 4,903,234 | 2/1990 | Sakuraba et al. | 395/400 |
| 4,905,141 | 2/1990 | Brenza | 395/425 |
| 4,992,936 | 2/1991 | Katada et al. | 395/400 |
| 5,058,003 | 10/1991 | White | 395/400 |
| 5,133,058 | 7/1992 | Jenson | 395/400 |
| 5,263,140 | 11/1993 | Riordan | 395/400 |

Primary Examiner—Jack A. Lane
Attorney, Agent, or Firm—Whitham, Curtis, Whitham & McGinn; Floyd A. Gonzalez

[57] ABSTRACT

A dynamic address translation (DAT) mechanism which supports virtual memory pages of different sizes with minimal hardware and design impact. The dynamic look-aside table (DLAT) is modified to allow the addition of a second page size to system architecture. In one approach, the DLAT is divided into two sections, one for small (4KB) pages and one for large (1MB) pages. A steering table indicates whether the segment last contained 4KB pages or a 1MB page. As each segment is translated by the DAT mechanism, the page size (1MB or 4KB) contained in the segment is known, and this information is used to select the address bus used for indexing the DLAT. In an alternative approach, the DLAT is not divided into sections; rather, it can interchangeably hold/test/select either of the two different formats in any entry. The steering table dynamically changes the way in which the DLAT is addressed and selects the bits of the entry to be used in the translation.

5 Claims, 4 Drawing Sheets

DYNAMIC LOOK-ASIDE TABLE FOR MULTIPLE SIZE PAGES

This is a Continuation of application Ser. No. 07/668,568 Mar. 13, 1991, now abandoned.

CROSS-REFERENCE TO RELATED APPLICATION

This application is related in subject matter to copending U.S. Pat. No. 5,058,003 issued Oct. 15, 1991, by Steven W. White for ADDRESS TRANSLATION MECHANISM FOR MULTIPLE-SIZED PAGES and assigned to the assignee of this application. The subject matter of U.S. Pat. No. 5,058,003 is incorporated herein by reference.

DESCRIPTION

BACKGROUND OF THE INVENTION

1. Field of the Invention

The present invention generally relates to virtual storage mechanisms for data processing systems and, more particularly, to a technique for supporting different page sizes with only slight modifications to existing hardware.

2. Description of the Prior Art

Virtual storage organization and management for data processing systems are described, for example, by Harvey M. Deitel in *An Introduction to Operating Systems*, Addison-Wesley (1984), by Harold Lorin and Harvey M. Deitel in Operating Systems, Addison-Wesley (1981), and by Harold S. Stone in *High-Performance Computer Architecture*, Addison-Wesley (1987). In a virtual storage system, paging is a relocation and address-to-physical-location binding mechanism providing the user of the system with what appear to be considerably larger memory spaces than are really available. The key feature of the virtual storage concept is disassociating the addresses referenced in a running process from the addresses available in main storage. The addresses referenced by the running process are called virtual addresses, while the addresses available in main storage are called real addresses. The virtual addresses must be mapped into real addresses as the process executes, and that is the function of the dynamic address translation (DAT) mechanism. One such mechanism employs a directory look-aside table (DLAT), sometimes referred to as a translation look-aside buffer (TLB), which stores recent virtual address translations. For virtual addresses stored in the DLAT, the translation process requires only a single or, at most, a couple of machine cycles. For addresses not stored in the DLAT, the DAT process may take from fifteen to sixty cycles.

Translations from the virtual address to the real address must be made to find where the addressed instruction or data is in main storage. This is typically done on a page basis. In fact, the translations stored in the DLAT are actually only page translations, and the last bits of an address are the location in that page, so only the page address must be translated.

In architectures that support only one size page, the optimal size of the page is selected by a trade-off of the relative advantages of small and large pages. Large pages allow better amortization of paging overheads and provide larger coverage of the virtual space for a given DLAT size. On the other hand, small pages allow many different localities to be maintained for a given real storage size and incur minimal wasted real storage space. While small (4KB) pages may be appropriate for code segments (instructions), high performance scientific and engineering computers often benefit from large (1MB) pages. For example, the performance of vector fetches and stores benefits from large pages simply by decreasing the number of possible page crossings and the number of DLAT misses. Therefore, for an optimized design of such computers, support for multiple-size pages is desirable.

SUMMARY OF THE INVENTION

It is therefore an object of the present invention to provide dynamic address translation mechanism which supports virtual memory pages of different sizes with minimal hardware and design impact.

According to a preferred embodiment of the invention, the dynamic look-aside table (DLAT) is modified to allow the addition of a second page size to system architecture. In one approach, the DLAT is divided into two sections, one for small (4KB) pages and one for large (1MB) pages. A steering table indicates whether the segment last contained 4KB pages or a 1MB page. As each segment is translated by the DAT mechanism, the page size (1MB or 4KB) contained in the segment is known, and this information is used to select the address bus used for indexing the DLAT. In an alternative approach, the DLAT is not divided into sections; rather, it can interchangeably hold/test/select either of the two different page formats in any entry. The steering table dynamically changes the way in which the DLAT is addressed and selects the bits of the entry to be used in the translation.

While the preferred embodiment of the invention is described as supporting two virtual address page sizes of 4KB and 1MB and assumes a specific 31-bit virtual address format and a DLAT with 256 congruence classes, it will be understood from the following description that by straight forward extension of the principles taught, the invention can be implemented to support different page sizes, different virtual address format, and a DLAT with a different number of congruence classes.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENTS OF THE INVENTION

Figure 1:
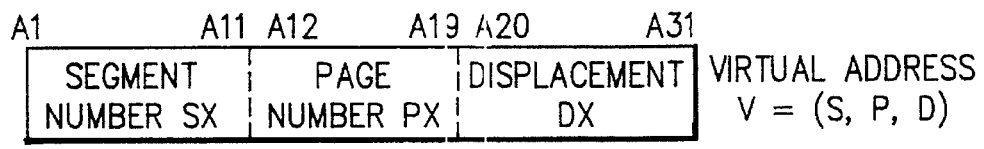
FIG. 1 is a block diagram illustrating a possible format for a virtual address with 4KB page size.

A conventional paging/segmentation virtual address system is first described. The description uses the term DLAT for dynamic look-aside table, but those skilled in the art will understand that this term may be used interchangeably with TLB for translation look-aside buffer. In conventional paging/segmentation virtual address systems, the virtual address format is as shown in FIG. 1 and comprises s-bits for the segment index (SX), p-bits for the page index (PX), and d-bits for the displacement index (DX). The virtual address may be, for example, 32 bits of which bits A1 through A11 comprise the segment bits, bits A12 through A19 comprise the page bits, and bits A20 through A31 comprise the displacement bits.

Figure 2:
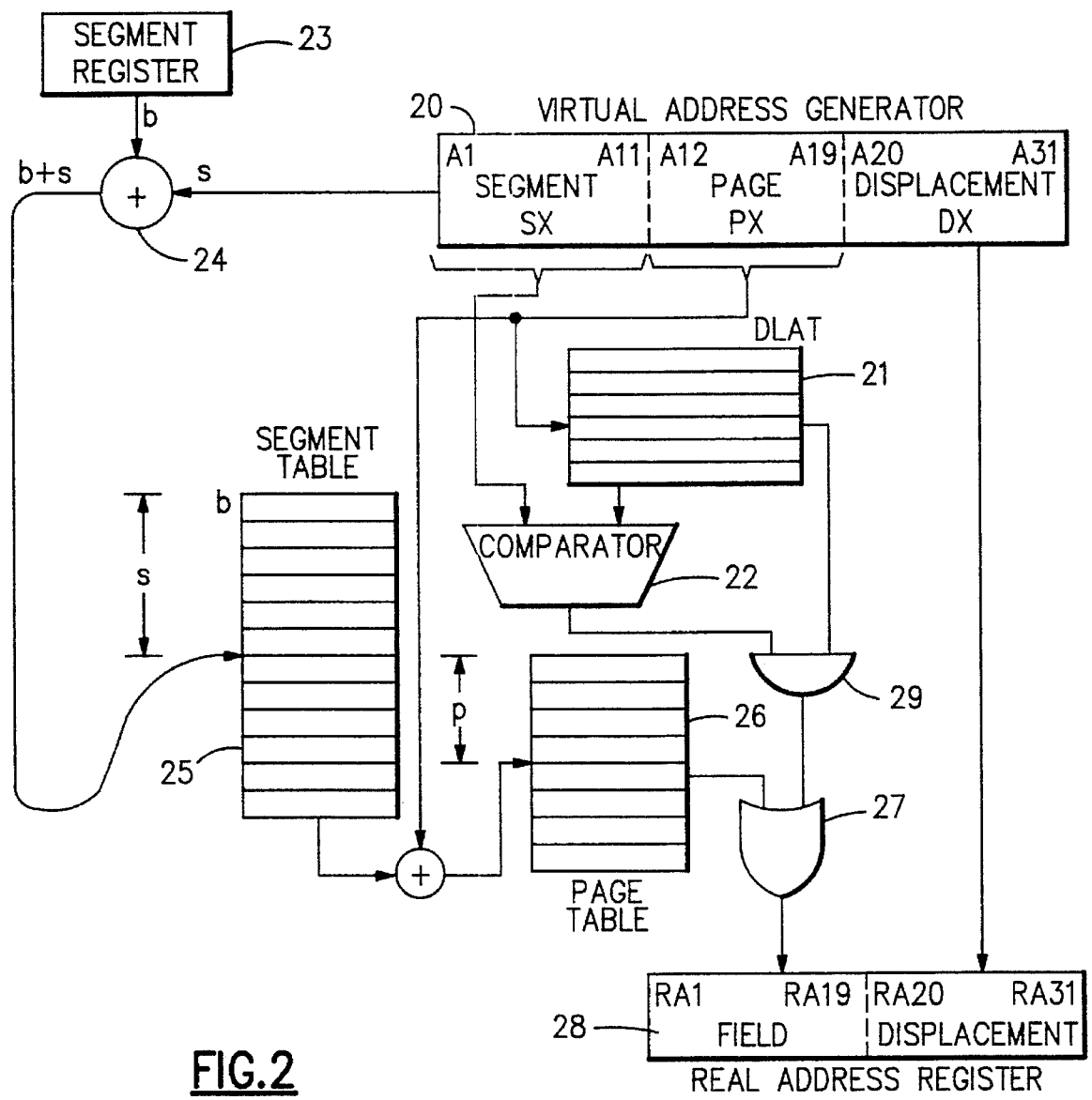
FIG. 2 is a block diagram of a conventional dynamic address translation structure for such a virtual address, using a DLAT with 256 congruence classes.

As shown in FIG. 2, the virtual address is generated by address generator 20. The address generator 20 is part of a central processing unit (CPU) (not shown). The most recently referenced pages have entries in the DLAT 21. For a DLAT with 256 congruence classes, bits A12 through A19 of the virtual address are used to address the DLAT 21. The virtual page identification bits from the addressed entry read out of the DLAT 21 are compared in comparator 22 with bits A1 through A11 of the virtual address. If there is no match, a DLAT miss has occurred. On a DLAT miss, address translation is obtained through, for example, a segment/page table search and placed in the DLAT.

The segment/page table search begins by adding the value in the segment table origin register 23 and the bits A1 to A11 of the virtual address in adder 24 to obtain an index value for the segment map table 25. The entry output from the segment map table 25 is added to bits A12 through A19 of the virtual address to obtain the address of the page map table 26 entry, there being a separate page map table for each segment. The entry output from the page map table 26 provides the page frame at which the virtual page resides in real storage and is passed by OR gates 27 and concatenated with the displacement bits A20 through A31 of the virtual address generator 20 to form the real address in real address register 28.

On the other hand, if there is a match in the DLAT 21, the comparator 22 enables AND gates 29 which passes the entry output from the DLAT 21 to OR gates 27. In this case, the entry output from the DLAT 21 is the associated real address field which is concatenated to the displacement bits A20 through A31 to form the real storage address in register 28. Obviously, this process of address translation is considerably faster than that of the segment/page table search which occurs on a DLAT miss.

It will be understood, however, that even when a segment/page table search is performed, the segment map table search may indicate that the segment is not in primary or main storage, causing the operating system to locate the segment on secondary storage, i.e., a direct access storage device (DASD) (not shown), create a page table for the segment, and load the appropriate page into main storage. Even if the segment is in main storage, the desired page may not be in main storage, causing the operating system to locate the page on secondary storage and loading the page in main storage.

The foregoing description is for a conventional DLAT structure. Such a DLAT structure supports a single virtual address page size. The subject invention modifies this structure so that multiple virtual address page sizes are supported. The preferred embodiment of the invention is described in terms of modifications to the DLAT of processors implementing the IBM System/370-XA (extended architecture) to allow the addition of a second page size to the architecture. The System/370-XA is distinguished from the IBM System/370 architecture in that it uses a 31-bit memory address whereas the latter uses a 24-bit memory address. Thus, the System/370-XA is capable of addressing up to two giga bytes (GBs) of memory. In this example, the added page size is 1MB, the existing page size being 4KB. A description of the dynamic address translation in the IBM System/370 architecture may be found in IBM Publication No. GA22-7000-10 entitled *IBM System/370, Principles of Operation*, at pages 3–20 to 3–22. It will be understood by those skilled in the art that the description is illustrative and, without loss of generalization, the invention may be applied to other and different architectures.

Figure 3:
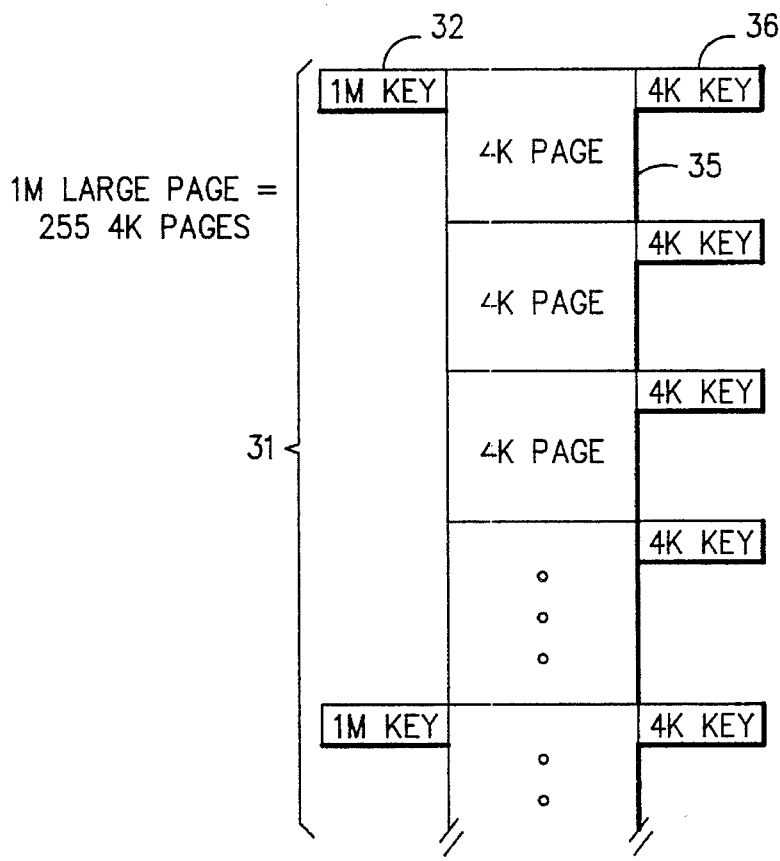
FIG. 3 is a memory map showing the relationship between 1MB and 4KB pages with their respective access keys.

In the following description, a 1MB "large" page is added to improve the performance of the vector processor of the System/370-XA. Referring now to FIG. 3 of the drawings, there is shown the relationship between 1MB and 4KB pages for this architecture. A large 1MB page 31 is identified by a corresponding 1MB key 32. In terms of size, the 1MB page 31 is composed of 256 4KB small pages 35, each identified by a corresponding 4KB key 36.

Figure 4:
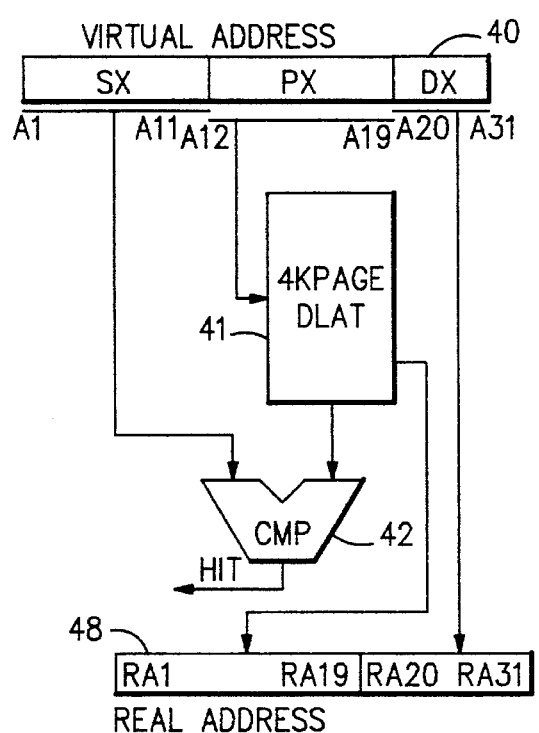
FIG. 4 is a block diagram showing the existing DLAT hardware for 4KB pages.

A portion of the existing DLAT architecture for the 4KB page as shown in FIG. 2 is shown in FIG. 4. It will be understood, for example, that an output of the comparator 42 indicates a DLAT "hit", allowing the entry output from the DLAT 41 to be entered into the real address register 48. As described with reference to FIG. 2, the virtual address in the IBM System/370-XA comprises address bits A1 through A31, which are stored in virtual address generator 40. Address bits A1 through A11 are the segment index (SX) bits, address bits A12 through A19 are the page index (PX) bits, and address bits A20 through A31 are the displacement index (DX) bits. For a DLAT with 256 congruence classes, bits A12 through A19 of the virtual address are used to address the DLAT 41. The virtual page identification portion of addressed entry read out of the DLAT 41 is compared in comparator 42 with the virtual address bits A1 through A11. If there is a match, i.e., a "hit", as determined by the comparator 42, the addressed entry read out of the DLAT 41 is input to bits RA1 through RA19 of the real address register 48. The virtual address displacement index bits A20 through A31 of the virtual address are passed through to bits RA20 through RA31 of the real address register to complete the real address.

Figure 5:
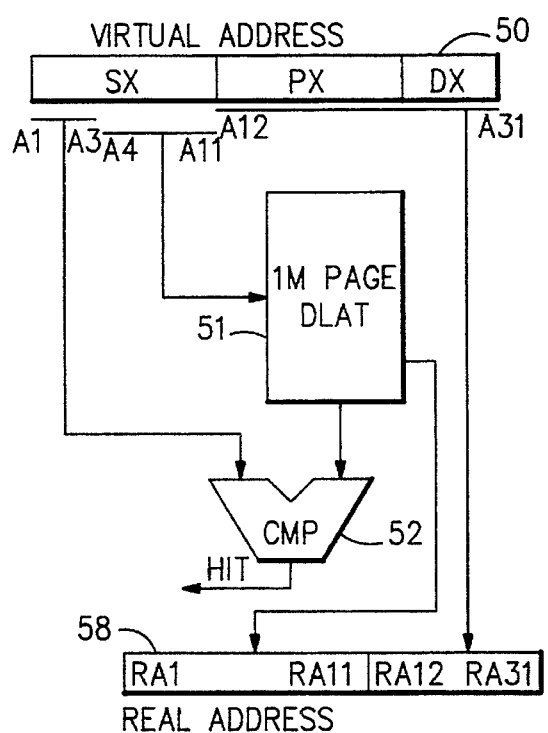
FIG. 5 is a block diagram showing a DLAT needed for 1MB pages.

The DLAT needed for the large page is shown in FIG. 5. It is similar to the DLAT shown in FIG. 4 except bits A4 through A11 of the virtual address generator 50 are used to address the DLAT 51, the bits A1 through A3 of the virtual address are compared in comparator 52 with the corresponding virtual page identification bits of the addressed entry read out of the DLAT 51, and the real address in register 58 is composed of segment address bits RA1 through RA11 read out of the DLAT 51 and page and displacement index bits RA12 through RA31 passed through from the virtual address bits A12 through A31.

In FIGS. 4 and 5, both DLATs 41 and 51 have 512 entries with a two-way set associativity resulting in 256 congruence classes. Therefore, an address of eight bits (i.e., A12 through A19 or A4 through A11) is needed to address the DLAT, and two entries from the same set are fetched out for comparison.

There are three approaches to implementing a DLAT mechanism to support multiple size pages, and these are described in more detail below. The first is to add a second DLAT for the large pages. The second is to partition the existing DLAT into two sections, one for 4KB pages and one for 1MB pages. The third is to create a different type of DLAT system which can interchangeably hold/test/select either of the two different page formats in any entry. It will, of course, be appreciated that each of these approaches may be suitably modified to support more than two pages.

Figure 6:
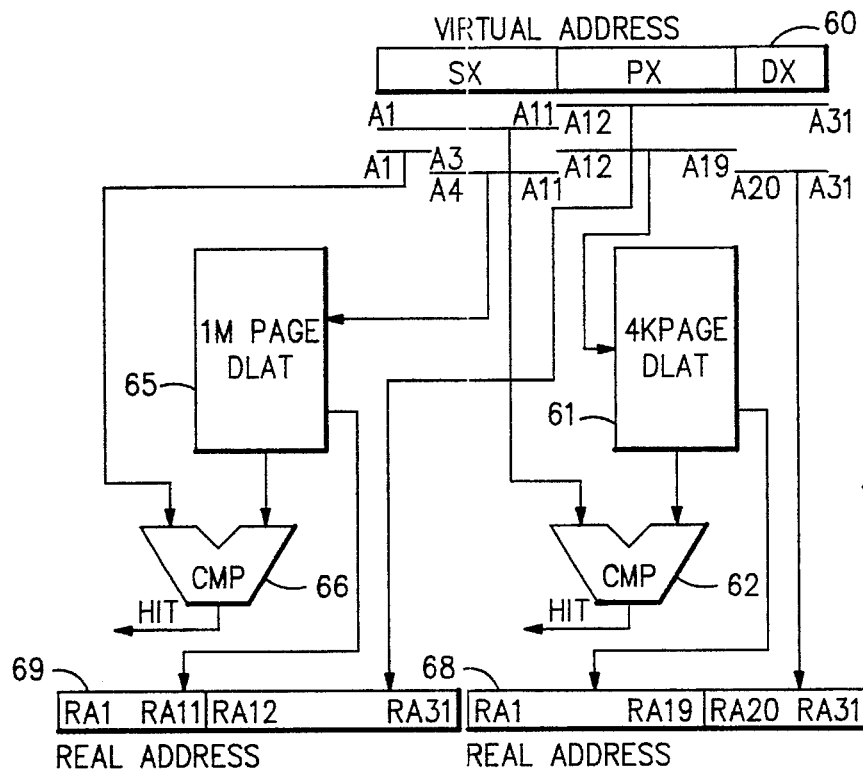
FIG. 6 is a block diagram of a dynamic address translation structure with separate DLATs for 4KB and 1MB pages.

Since the 4KB and 1MB page entries have entirely different formats, a second DLAT can be added as shown in FIG. 6. This arrangement comprises a 4KB page DLAT 61 addressed by bits A12 through A19 of the virtual address and a 1MB page DLAT 65 addressed by bits A4 through A11 of the virtual address. When an address translation is needed, both DLATs are accessed, each using the appropriate bits from the virtual address generator 60. There will be one and only one hit if one of the DLATs contains a valid entry of translation, as determined by the comparators 62 and 66. Thus, the correct real address will be read into one of the real address registers 68 or 69, the outputs of the comparators indicating which, if either, of the real addresses is correct.

This approach is the most straight forward way to include support for a second page size of 1MB. However, the hardware overhead needed is large, roughly doubling the hardware required for the single page size DLATs shown in FIGS. 4 and 5. In addition, the number of input/output (I/O) pins needed on the address chips is increased, taking more chip space on the multi-chip module. This is the approach taken in the above-cited U.S. Pat. No. 5,058,003.

Figure 7:
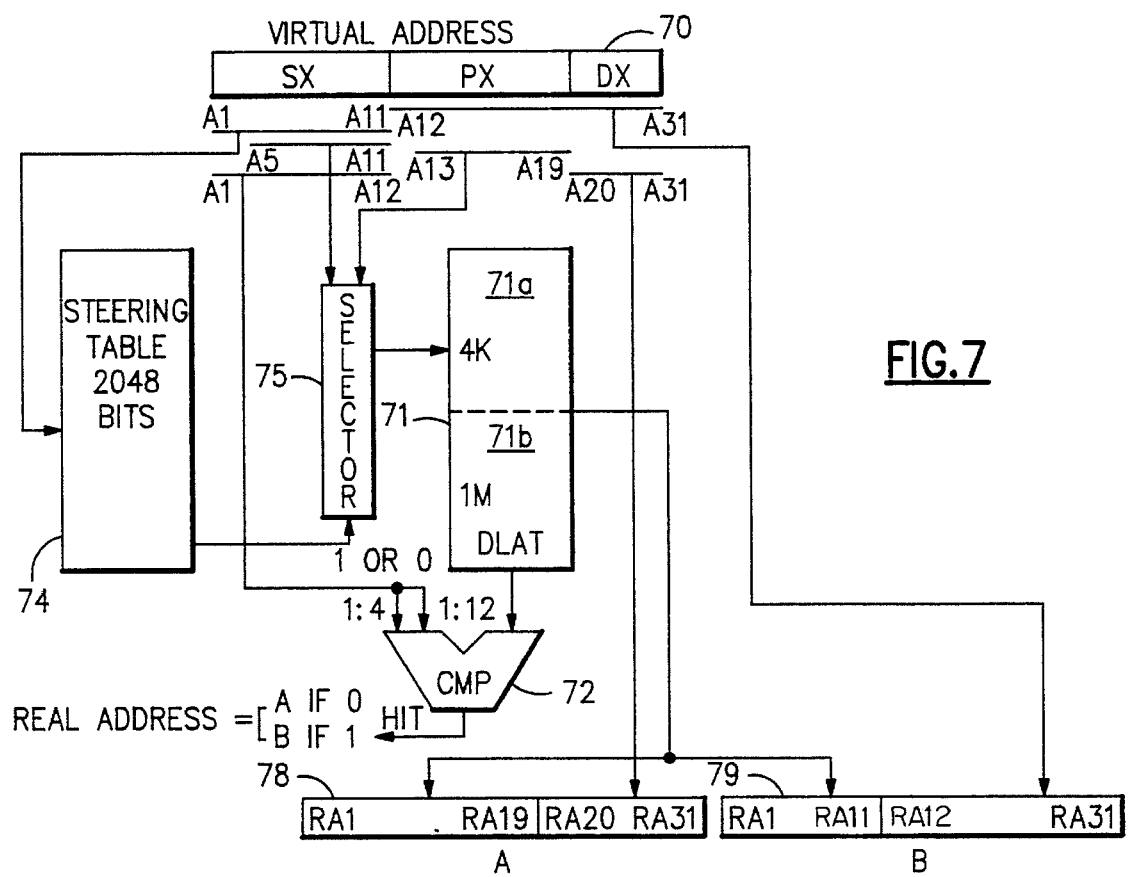
FIG. 7 is a block diagram showing a single DLAT separated into two sections and a mechanism for selecting the section that should be accessed first.

FIG. 7 shows the second approach and the first of the two alternative preferred embodiments of the invention. This approach separates the existing DLAT 71 into two sections, 71a and 71b, respectively for 4KB pages and 1MB pages. The segment index bits A1 to A11 in the virtual address are used to address a steering table 74 which consists of 2048 bits of information, one bit per segment for a virtual memory of two giga bytes (GB). Each bit in the steering table 74 indicates whether the segment last contained 4KB pages or a 1MB page.

Initially, all bits are set to "0", meaning the segment contains 4KB pages. As each segment is translated by the dynamic address translation (DAT) mechanism, the page size (1MB or 4KB) contained by the segment is known. The bit is set to "1" if the segment contains only a 1MB "large" page; otherwise, it is set to "0". Knowing the history of a segment, it is possible to select via selector 75 which address bus, A5 through A11 or A13 through A19, is to be used for indexing the DLAT 71.

The two sections 71a and 71b of the DLAT 71 in this illustrative embodiment are equal sections for simplicity, but this is not a necessary requirement. Since the DLAT 71 has only 128 congruence classes for 4KB pages, the entry format is modified. An extra bit from the virtual address is stored in the 4KB page DLAT entry. Virtual address bits A1 to A12 from virtual address generator 70 are selected for the comparison in comparator 72 with the DLAT entry if the steering table 74 indicates that the segment contained 4KB pages. Virtual address bits A13 to A19 are selected to address the 4KB DLAT entry and, on a "hit" as determined by comparator 72, the entry output from DLAT 71 is read into real address register 78. For 1MB pages, virtual address bits A5 to A11 are selected to address the DLAT entry while virtual address bits A1 to A4 are selected for comparison with the 1MB DLAT entry. In this case, a "hit" causes the entry output from DLAT 71 to be read into real address register 79.

This method maintains the performance of the 4KB translations as well as those of the 1MB pages. The hardware added is minimal, comprising for this illustrative example 2048 bits for the steering table 74, or simply one logic chip. This provides support for the large page with a minimum of hardware impact. Subsets or variations of this approach can also be made. For example, a smaller steering table can be constructed which groups a set or class of segments under a single bit. This allows a guess of the size of that segment. This does not require an increase in chip count. Since it is a guess, a performance penalty is paid on a wrong guess because the other DLAT section must then be accessed.

Figure 8:
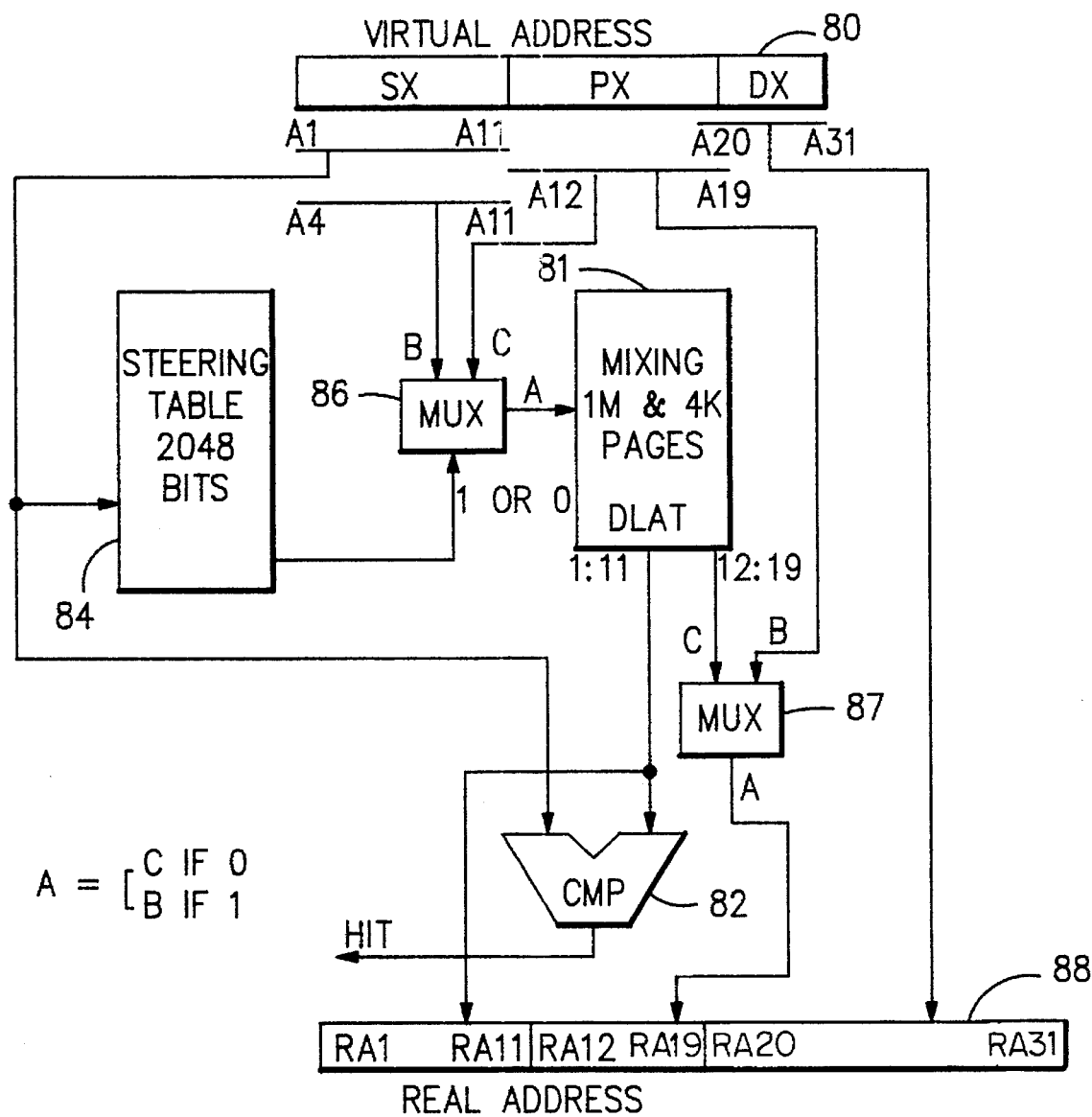
FIG. 8 is a block diagram showing an alternative embodiment in which the 4KB and 1MB pages are mixed in the DLAT and the way in which the DLAT is addressed is dynamically changed depending on the size of the page.

FIG. 8 shows the third approach. The steering table 84 is also an integral part of this design. However, instead of using it to select which section of the DLAT 81 is to be used, the table is now used to dynamically change the way in which the DLAT is addressed and select the bits of the entry to be used in the translation. If the steering table bit is a "0", indicating 4KB pages, virtual address bits A12 to A19 from virtual address generator 80 are passed by the multiplexer 86 to select DLAT entries. If the steering bit is a "1", indicating a 1MB page, eight bits of the virtual address, bits A4 to A11 are then passed by the multiplexer 86 to select the DLAT entries. In each case, the eleven bit virtual page identification field of the entries are compared in comparator 82 with virtual address bits A1 to A11. A match of bits A1 through A11 of the virtual address to the virtual page identification bits in a valid DLAT entry indicates that the entry contains a translation for that virtual address. The steering table bit is then used to select via multiplexer 87 the source of bits RA12 to RA19 of the real address in real address register 88. If the table bit is "0", the DLAT entry supplies bits RA12 to RA19 of the real address. If the bit is "1", bits A12 to A19 of the virtual address are used unchanged. Regardless of the steering table bit value, the real address (segment) bits A1 to A11 always come from the DLAT entry and bits A20 to A31 (byte index) always come from the virtual address.

This approach allows a dynamic allocation of the DLAT entries for 4KB and 1MB pages based on their relative frequency of use. Thus, it allows optimal performance for different types of tasks. Moreover, it requires only a modest increase in hardware while giving the best performance for both 4KB and 1MB pages. It should be understood, however, that the bits selected for DLAT entry addressing and for comparison with the effective address may be appropriately chosen to support a different virtual address format and different DLAT size and organization. The specific bits described above are thus exemplary and may be changed.

While the invention has been described in terms of two alternate preferred embodiments which support two virtual memory page sizes, those skilled in the art will recognize that the invention can be practiced with modification within the spirit and scope of the appended claims. Specifically, the teachings of the invention can be extended to support more than two virtual memory page sizes.

Having thus described our invention, what we claim and desire to secure by Letters Patent is as follows:

1. An address translation mechanism for a virtual storage system in a data processing system which supports a plurality of page sizes, comprising:

means for storing virtual addresses to be translated to real addresses, each of said virtual addresses being composed of segment index bits, page index bits and displacement index bits, each of said virtual addresses having a plurality of subsets of bits;

a single dynamic look-aside table for simultaneously storing, for all said plurality of page sizes, translations of said virtual addresses to real addresses, said plurality of page sizes having indices associated therewith;

steering table means for storing said indices of said plurality of page sizes of translations and selecting a correct index for a virtual address to be translated when said steering table means is addressed by segment index bits of said virtual address to be translated; and means responsive to the correct index selected for selecting out of said plurality of subsets of bits of said virtual address to be translated one subset which corresponds to a page size of said virtual address to be translated for addressing said dynamic look-aside table.

2. The address translation mechanism recited in claim 1 wherein said dynamic look-aside table is divided into at least two sections corresponding to said at least two sizes of pages, and said means for selecting comprises a selector controlled by said steering table means to pass at least a selected group of virtual address bits for addressing said dynamic look-aside table depending on whether the history stored in said steering table means for the segment index bits of said virtual address to be translated indicates that the segment contained a first or a second page size respectively.

3. The address translation mechanism set forth in claim 2 wherein said virtual address to be translated includes address bits, said address translation mechanism further including:

comparison means for comparing said address bits of said virtual address to be translated with virtual bits read out of said single dynamic look-aside table in response to said one subset;

multiple register means coupled to said means for storing virtual addresses to be translated and said single dynamic look-aside table for storing different possible real addresses made up of combinations of real and virtual address bits read from the means for storing virtual addresses to be translated and said single dynamic look-aside table; and means responsive to said comparison means to select one of said possible real addresses as a real address translation for said virtual address to be translated.

4. The address translation mechanism as recited in claim 1, wherein said single dynamic look-aside table includes a plurality of addresses, wherein translations, for a plurality of different page sizes for said virtual addresses to real addresses are interspersed within said plurality of addresses in said dynamic look-aside table such that a translation for a first page size of said plurality of different page sizes and a translation for a second page size if said plurality of different page sizes are located at adjacent addresses of said plurality of addresses of said single dynamic look-aside table.

5. The address translation mechanism set forth in claim 4, wherein said virtual address to be translated includes bit positions having page address bits therein and said dynamic look-aside table includes virtual bits, said virtual bits being located in bit positions of said dynamic look-aside table which correspond to those of said virtual address to be translated, said address translation mechanism further including:

comparison means for comparing page address bits from said bit positions of said virtual address to be translated with said virtual bits, in said bit positions which correspond to those of said virtual address to be translated read out of said dynamic look-aside table in response to said one subset; and means responsive to said comparison means for generating a real address translation of said virtual address to be translated said means for generating including means for selecting one of different possible combinations of virtual and real address bits stored in the means for storing virtual addresses to be translated and said single dynamic look-aside table.

\* \* \* \* \*